United States Patent
Melmon et al.

(10) Patent No.: US 9,317,202 B2
(45) Date of Patent: Apr. 19, 2016

(54) KEYBOARD OVERLAY THAT IMPROVES TOUCH TYPING ON SMALL TOUCH SCREEN DEVICES

(71) Applicant: Touchfire, Inc., Seattle, WA (US)

(72) Inventors: Bradley S. Melmon, Seattle, WA (US); Steven A. Isaac, Seattle, WA (US); Ralph Levy, Doylestown, PA (US)

(73) Assignee: Touchfire, Inc., Seattle, WA (US)

( * ) Notice: Subject to any disclaimer, the term of this patent is extended or adjusted under 35 U.S.C. 154(b) by 0 days.

(21) Appl. No.: 14/484,714

(22) Filed: Sep. 12, 2014

(65) Prior Publication Data

US 2015/0070281 A1   Mar. 12, 2015

Related U.S. Application Data

(60) Provisional application No. 61/877,008, filed on Sep. 12, 2013.

(51) Int. Cl.
G06F 3/0488 (2013.01)
G06F 3/039 (2013.01)

(52) U.S. Cl.
CPC ............ G06F 3/04886 (2013.01); G06F 3/039 (2013.01); G06F 2203/04809 (2013.01)

(58) Field of Classification Search
CPC .............. G06F 3/04886; G06F 3/0412; G06F 2230/04809; G06F 1/1662–1/1673; G06F 3/039
USPC ......................................................... 345/168
See application file for complete search history.

(56) References Cited

U.S. PATENT DOCUMENTS

| 4,127,752 | A | 11/1978 | Lowthorp |
| 4,529,849 | A | 7/1985 | Kamei et al. |
| 4,762,436 | A | 8/1988 | Herzog et al. |
| 4,952,761 | A | 8/1990 | Viebrantz |
| 5,389,757 | A | 2/1995 | Souliere |
| 5,572,573 | A | 11/1996 | Sylvan et al. |
| 5,612,692 | A | 3/1997 | Dugas et al. |

(Continued)

FOREIGN PATENT DOCUMENTS

| CN | 201674482 | 12/2010 |
| GB | 2313343 | 11/1997 |

(Continued)

OTHER PUBLICATIONS

Kim, Eugene; "iKeyboard for Apple iPad Review & Rating"; Oct. 11, 2012; pcmag.com.*

(Continued)

*Primary Examiner* — Larry Sternbane
(74) *Attorney, Agent, or Firm* — Perkins Coie LLP

(57) ABSTRACT

A keyboard overlay for use with a virtual touch screen keyboard, and associated systems and methods are disclosed. In accordance with one embodiment of the present technology, a keyboard is overlaid over a plurality of virtual keys that have virtual key centers laterally spaced apart from each other. The keyboard can have a base configured to be coupled to the virtual touch screen keyboard and a plurality of overlay key structures corresponding to the virtual keys. The overlay key centers of the individual overlay key structures have overlay key centers, and at least a subset of the overlay key structures can be arranged such that the overlay key centers of the subset are offset relative to the virtual key centers of the corresponding virtual keys.

13 Claims, 8 Drawing Sheets

(56) References Cited

U.S. PATENT DOCUMENTS

| | | |
|---|---|---|
| 5,887,995 A | 3/1999 | Holehan |
| 5,909,211 A | 6/1999 | Combs et al. |
| 6,259,044 B1 | 7/2001 | Paratore et al. |
| 6,492,978 B1 | 12/2002 | Selig et al. |
| 6,667,738 B2 | 12/2003 | Murphy |
| 6,776,546 B2 | 8/2004 | Kraus et al. |
| 6,791,480 B1 | 9/2004 | Uke |
| 6,880,998 B2 | 4/2005 | Kraus et al. |
| 6,996,426 B2 | 2/2006 | Granberg |
| 7,412,258 B1 | 8/2008 | Lipponen et al. |
| 7,479,949 B2 | 1/2009 | Jobs et al. |
| 7,602,378 B2 | 10/2009 | Kocienda et al. |
| 7,614,008 B2 | 11/2009 | Ording |
| 7,659,885 B2 | 2/2010 | Kraus et al. |
| 7,663,607 B2 | 2/2010 | Hotelling et al. |
| 7,812,828 B2 | 10/2010 | Westerman et al. |
| 7,844,914 B2 | 11/2010 | Andre et al. |
| 7,941,760 B2 | 5/2011 | Kocienda |
| 8,558,796 B2 * | 10/2013 | Giancarlo ............. G06F 1/1662 345/168 |
| 2003/0235452 A1 | 12/2003 | Kraus et al. |
| 2004/0212598 A1 | 10/2004 | Kraus et al. |
| 2004/0248621 A1 | 12/2004 | Schon |
| 2007/0013662 A1 | 1/2007 | Fauth |
| 2008/0030476 A1 | 2/2008 | Raj V.A. |
| 2008/0282873 A1 | 11/2008 | Kotton et al. |
| 2009/0148219 A1 | 6/2009 | Odell et al. |
| 2010/0079403 A1 | 4/2010 | Lynch et al. |
| 2010/0238119 A1 | 9/2010 | Dubrovsky et al. |
| 2010/0253634 A1 | 10/2010 | Lin et al. |
| 2010/0302168 A1 | 12/2010 | Giancarlo et al. |
| 2011/0143835 A1 | 6/2011 | Sizelove |
| 2011/0157037 A1 | 6/2011 | Shamir et al. |
| 2011/0241999 A1 | 10/2011 | Thier |
| 2011/0260976 A1 | 10/2011 | Larsen et al. |
| 2011/0316785 A1 | 12/2011 | Hidary |
| 2012/0050165 A1 | 3/2012 | Kim et al. |
| 2012/0086642 A1 | 4/2012 | Weihe |
| 2012/0119996 A1 | 5/2012 | Wu et al. |
| 2012/0274565 A1 * | 11/2012 | Moser ................... G06F 1/1616 345/168 |
| 2014/0022174 A1 * | 1/2014 | Chen ....................... G06F 3/044 345/168 |
| 2014/0055363 A1 * | 2/2014 | Meierling ............. G06F 1/1662 345/169 |

FOREIGN PATENT DOCUMENTS

| | | | | |
|---|---|---|---|---|
| GB | 2516439 A * | 1/2015 | .......... | G06F 3/04886 |
| JP | 04075219 | 4/2008 | | |
| JP | 2011113248 | 6/2011 | | |
| WO | WO 2010082196 | 7/2010 | | |

OTHER PUBLICATIONS

Kooser, Amada; "Touchfilre: iPad keyboard overlay is a soft touch"; Nov. 2, 2011; cnet.com.*

John Brownlee, The iKeyboard Tries to Bring Touch Typing to the iPad, May 11, 2011, Cult of Mac, http://www.cultofmac.com/94535/the-ikeyboard-tries-to-bring-touch-typing-to-the-ipad/.

* cited by examiner

KEYBOARD OVERLAY THAT IMPROVES TOUCH TYPING ON SMALL TOUCH SCREEN DEVICES

CROSS-REFERENCE TO RELATED APPLICATION

This application claims priority to U.S. Provisional Application No. 61/877,008, filed Sep. 12, 2013, and entitled A KEYBOARD OVERLAY THAT IMPROVES TOUCH TYPING ON SMALL TOUCH SCREEN DEVICES, which is incorporated herein in its entirety by reference.

TECHNICAL FIELD

The present technology relates to keyboard overlays that improve the accuracy and experience of touch typing on touch screen virtual keyboards.

BACKGROUND

For the sake of clarity, a North/South (e.g., elevation) and East/West (e.g., lateral) orientation reference system is used in this document to describe dimensions and directions in a plane defined by the keyboard layout (e.g., a virtual keyboard and/or an overlay keyboard). The northern most alpha row of a QWERTY keyboard is designated Row 1 and at least contains the letter keys "Q", "W", "E", "R", "T", "Y", "U", "I", "O", "P." Row 2, the next row south of row 1, is also referred to as the "home row" and contains at least the letters "A", "S", "D", "F", "G", "H", "J", "K" and "L." The touch typist places eight fingers on specific keys in the home row, rests them there when not typing, and returns to them while typing in order to reorient their fingers. These keys are referred to as the "home row rest keys." On a standard QWERTY keyboard, these are the "ASDF" keys for the four left fingers and the "JKL"; keys for the right four fingers. Row 3, the next row south of Row 2, contains at least the letters "Z", "X", "C", "V", "B", "N", and "M." Row 4, the next row south of Row 3, is also referred to as the "space-bar row." The directions "vertical", "straight up", "straight down", or "normal" are used synonymously and interchangeably to describe trajectories essentially transverse (e.g., such as perpendicular) to a plane defined by the entire keyboard layout, or in the case of digital tablets, approximately perpendicular to the glass touch-screen. Note that this is simply a labeling mechanism—the present technology is not dependent on the keyboard layout of the underlying virtual keyboard. As such, the present technology can be applied to other configurations, such as, AZERTY, Dvorak, numeric, split keyboard, or any other keyboard layout used for touch typing with similar functionality explained below.

Keyboard overlays, such as those described in U.S. Pat. No. 8,206,047, which is commonly owned with the present application and incorporate by reference herein in its entirety (attached as Appendix A), enhance touch typing on touch screen devices, such as the iPad® tablet computer manufactured by Apple, Inc. A keyboard overlay is designed to go on top of the virtual keyboard on a touch screen device, and adds physical elements that provide tactile feedback to determine the location of the keys. A keyboard overlay also allows users to rest their fingers on the home row without accidentally triggering the virtual keys of a touch screen. The keyboard overlay is composed of multiple key structures, each of which is oriented over a corresponding virtual key on the underlying virtual keyboard. The overlay key structures have mechanical geometries that emulate the performance and tactile characteristics of mechanical key switches of conventional computer keyboards, and provide new performance and tactile characteristics that have no equivalent mechanical keyboard counterpart.

Several embodiments of keyboard overlays disclosed in U.S. Pat. No. 8,206,047 provide a solution to a number of issues that arise when touch-typing on the virtual keyboard of a touch screen device. For example, without a keyboard overlay as described in U.S. Pat. No. 8,206,047, touch typing is difficult because of the following issues:

1. Typists cannot rest their fingers on the home row of the virtual keyboard displayed on the touch screen since this would immediately trigger multiple unwanted key actuations.

2. There is no mechanism for decelerating the typist's fingers before they impact the touch screen. Given the ballistic nature of high speed touch typing, typist's fingers strike the hard touch screen at a high rate of speed with every key stroke. This can result in significant discomfort for the typist and increases the likelihood of repetitive stress injuries over time.

3. It is difficult for touch typists to reliably ascertain that they have correctly actuated a key when typing rapidly on these devices, since there is no subliminal tactile cue prior to actuation. The only tactile cue the user receives is from impact with the touch screen. This causes a significant decrease in typing speed and increases error rates.

4. There is no spring-back when the typist reverses their finger after completing a stroke. This results in slower typing speeds and less comfort while typing.

5. There are no tactile reference points for detecting the location of keys on the virtual keyboard. Thus, it is very easy for a touch typist's fingers to inadvertently drift off the key locations over time during typing. In order to compensate, typists must look down at the keyboard at all times. This eliminates one of the major benefits of touch typing—allowing the typist to focus their attention on something other than the keyboard while typing.

Keyboard overlays, such as several embodiments described in U.S. Pat. No. 8,206,047, are designed to work in cooperation with the software used to implement the virtual keyboard of a touch screen device to enable effective touch-typing on a touch screen device. For example, the characteristics of virtual keyboard software in modern touch screen devices are described and shown in U.S. Pat. Nos. 7,479,949 7,602,378, 7,614,008, 7,844,914, 7,602,378, 7,614,008, 7,812,828 and 7,941,760.

In operation, several relevant features of virtual keyboard software from a keyboard overlay perspective are as follows:

1. The virtual keyboard software extends the actual touch detection area of a key into the visual border (e.g., grey area) that visually separates the keys. Therefore, all locations on the virtual keyboard will register a key press when touched. The hit detection boundary between two keys is equidistant between the visible borders of the keys.

2. When a finger strike overlaps two or more key hit detection boundaries, virtual keyboard software determines the area (e.g., oval shape) of the multiple touch screen points actuated by the pad of the user's finger. The area of the finger strike within each virtual key's hit detection boundary is computed, and the key press is registered to the virtual key that has the largest area.

Several embodiments of the keyboard overlays described in U.S. Pat. No. 8,206,047 take advantage of these software features by not blocking any significant part of the finger oval from the underlying virtual keyboard.

Nonetheless, the lateral key pitch (East/West distance from the center of one key to the center of the adjacent key) of the underlying virtual keyboard is one factor in the effectiveness of a keyboard overlay for touch typing, and the importance of lateral key pitch complicates touch typing as touch screen devices get smaller and the key pitch shrinks.

A full size mechanical keyboard has a lateral key pitch of 19-19.5 mm. In contrast, the Apple iPad® has a 9.7 inch (246.4 mm) diagonal touch screen size that allows for a virtual keyboard with 18 mm lateral key pitch. Even though this is smaller than the key pitch of a full-size mechanical keyboard, sophisticated virtual keyboard software and an effective keyboard overlay can make touch typing on a virtual keyboard of this size work well. However, new tablet computers with even smaller virtual keyboards are now in the market.

For example, the Apple iPad mini° has a 7.9 inch (200.7 mm) touch screen size with a key pitch of only 14 mm. Touch typing becomes extremely difficult for many people with a lateral key pitch of only 14 mm. Many users simply don't have enough physical room to place all their fingers on the home row and still move their fingers in an unrestricted manner while typing on this device.

BRIEF DESCRIPTION OF THE DRAWINGS

Many aspects of the present technology can be better understood with reference to the following drawings. The components in the drawings are not necessarily to scale, but instead emphasis is placed on clearly illustrating the principles of the present technology.

DETAILED DESCRIPTION

Figure 1:
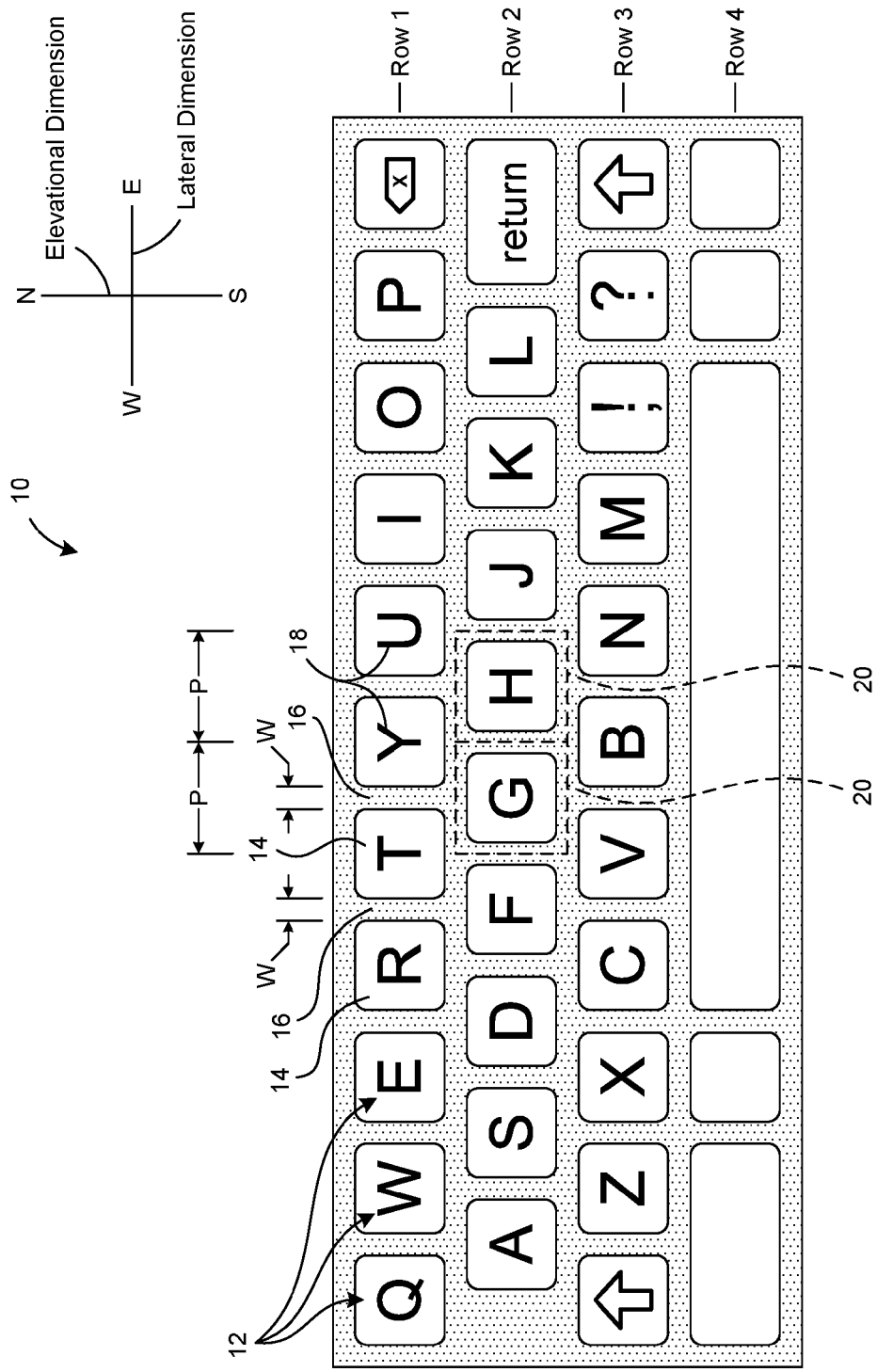
FIG. 1 shows a typical virtual keyboard with a QWERTY virtual key format.

The present technology is directed to keyboard overlays for use with a touch screen virtual keyboard that improve touch-typing on small touch screen devices. For example, particular embodiments of the present technology enhance the ability to touch-type with a virtual keyboard having a lateral key pitch of approximately 10 mm to 18 mm, but it will be appreciated that keyboard overlays in accordance with embodiments of the present technology can also be used to improve touch-typing on devices with a lateral key pitch greater than or equal to 18 mm. A person having ordinary skill in the relevant art will also understand that the present technology may be practiced without several of the details of the embodiments described herein with reference to FIGS. 1-8. For ease of reference, identical reference numbers are used to identify similar or analogous components or features throughout this disclosure, but the use of the same reference number does not imply that the features should be construed to be identical. Indeed, in many examples described herein, identically numbered features have a plurality of embodiments that are distinct in structure and/or function from each other. Furthermore, the same shading may be used to indicate materials in cross section that can be compositionally similar, but the use of the same shading does not imply that the materials should be construed to be identical unless specifically noted herein.

The alphanumeric keys on many mechanical computer keyboards have historically been of uniform size and pitch. The mechanical parts that make up these keys are often all identical, which provides a significant cost advantage in manufacturing and assembly. This characteristic is seen in several mechanical computer keyboards; even the smallest portable mechanical keyboards usually have uniform size and pitch alphanumeric keys. Thus, users generally expect keyboards to have this characteristic.

Virtual keyboards on existing commercially available touch screen devices also have a uniform lateral key pitch and key size for the alphanumeric keys. And since the virtual keyboard has this characteristic, existing keyboard overlays have also implemented uniform lateral key pitch and size for the key structures to match the size and placement of the corresponding virtual keys on the virtual keyboard.

Several embodiments of keyboard overlays in accordance with the present technology have non-uniform size key structures. For example, the overlay key structures can have different sizes and pitches than that of the virtual keys displayed by an underlying virtual keyboard to provide more comfortable and accurate touch typing. Several embodiments of the present technology are particularly useful with small touch screen devices. Many keyboard overlays in accordance with the present technology maintain the familiar visual appearance of a keyboard to the user, but the key centers of the overlay key structures are laterally offset from the key centers of the underlying virtual keys of a virtual keyboard such that the overlay key structures space the user's fingers apart from one another while also directing the user's fingers to locations on the touch screen that will result in registering the correct intended key strikes.

In one embodiment, the home row rest key structures on the keyboard overlay are expanded in size and pitch as much as possible since these key structures define the reference locations where users put down all of their fingers simultaneously when beginning to type. These overlay key structures are also used to periodically re-orient alignment as the user is typing, and therefore the home row rest key structures are prominent and easily detected tactilely. The home row rest key structures are actuated by striking the key in a generally downward vertical direction (e.g., approximately normal to the face of the key structures), which generates the most force and requires the most area to handle resisting this force properly. This is achieved by:

1. Shrinking the East-West size (e.g., lateral dimension) of the key structures that lie inside of the home row rest keys (e.g., the "G" and "H" keys on a QWERTY keyboard), and utilizing some of the lateral space that is normally occupied by those keys on the underlying virtual keyboard to expand the lateral dimensions of the home row rest keys; and/or 2. Shrinking the East-West (e.g., lateral) size of key structures that lie to the East and West of the home row rest keys (e.g., keys laterally outward of the home row rest keys including the "Return" key to the East and "CAPS LOCK" key or empty space to the West).

The smaller lateral dimensions of the G, H, Return and Caps Lock keys provides lateral space to increase the lateral dimensions and lateral pitch of the home row rest key structures. In many embodiments of the present technology, the lateral dimensions of the home row keys are increased to the point where the sidewall of a home row rest key structure lies on top of the visible edge of an adjacent key on the underlying virtual keyboard. The lateral dimensions of the home row keys may be limited because additional lateral expansion may compromise the accuracy of hit detection and the visual alignment integrity of the keyboard overlay. Nonetheless, this increase in the lateral dimensions of the home row keys often results in key structures that partially overlap the hit detection boundary of adjacent virtual keys on the underlying virtual keyboard, and overlay key structures that have a sidewall significantly outside of the visual edge of its corresponding virtual key on the virtual keyboard.

To accommodate the hit detection software, the overlay key structures are designed to channel (e.g., direct) off-center hits to the center of the overlay key structure, which will still be over the correct corresponding virtual key on the virtual keyboard. Also, the amount of overlap of the overlay key structure into the hit detection area of an adjacent virtual key is designed to have the area of a finger strike oval be mostly within the hit detection area of the correct virtual key to ensure that the virtual keyboard software will register a key strike for the correct key.

To accommodate the desired visual alignment for a user, the sidewalls of the overlay key structures and any area between key structures can be textured with a pattern that visually obscures the edges of the virtual keys on the virtual keyboard. In contrast, the tops of the overlay key structures can have transparent windows that are configured to provide direct visualization of the indicia of the underlying virtual keys. For example, several embodiments of overlay keyboards in accordance with the present technology have highly polished tops that allow the indicia on the keys of the virtual keyboard to be clearly seen by the user. Since the user is used to seeing uniformly spaced alphanumeric keys on computer keyboards, the highly visible key indicia visually floating in textured areas appears to the user to have the familiar uniform spacing. Yet, the actual lateral position of the key centers of several of the overlay keys are laterally off-set outward of the key centers of the underlying corresponding virtual keys.

The key structures on Row 1 and Row 3 may also be configured to maintain their relative position with respect to the home row rest keys. Touch-typists utilize the relative spatial relationship of other keys to the home row rest keys, not their absolute position on the keyboard. Since the Row 1 and Row 3 key structures are hit at an angle, not straight down, they are hit with less force by the user and should therefore offer less resistance. Therefore, the Row 1 and Row 3 overlay key structures can occupy less area and generally be smaller. This is also the case for the key structures inside the home row rest keys—the "G" and "H" keys on a QWERTY keyboard. In fact, in several embodiments, the non-home row rest overlay key structures can be smaller than their corresponding virtual keys on the virtual keyboard. For example, the overlay key structures in Rows 1 and 3 can be large enough so that the virtual key indicia can still be seen through the transparent tops of the overlay key structures, but otherwise the overlay key structures can be positioned flexibly to compensate for the increased lateral size of the home row rest key structures.

FIG. 1 is a top view of a typical virtual touch screen keyboard 10 having a QWERTY layout that keyboard overlays in accordance with the technology can be used. The virtual keyboard 10 has a plurality of virtual keys 12, and each virtual key 12 has a first area 14, a second area 16 around the first area 14, and indicia 18. The first area 14 is often a "white area" and the second area 16 is generally a "gray area" defining the borders of the white areas. The second areas 16 often have a width W in the lateral dimension, and the centers of the first areas 14 are spaced apart from each other by a pitch P. In most cases, the pitch P is constant across the alphanumeric keys in Rows 1-3. As described above, each virtual key 12 has an active area defined by the midlines of the second areas 16 bordering the virtual key 12. For example, the G and H keys shown in FIG. 1 have corresponding active areas 20 (shown in dashed lines). Any coordinates of the touch screen in these active areas that are activated by the presence of a user's finger or other device are thus assigned to the corresponding virtual key 12.

Figure 2:
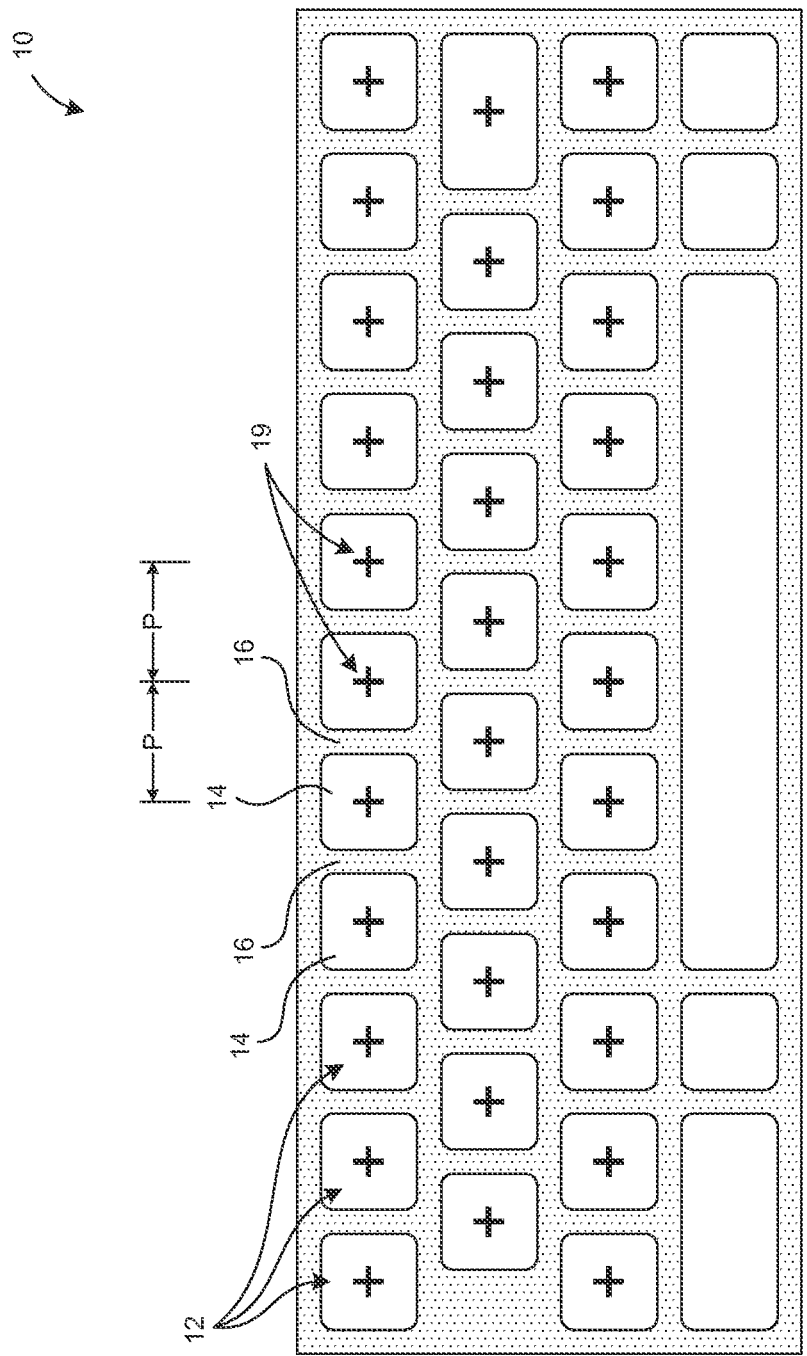
FIG. 2 shows the virtual keyboard with "+" symbols marking the centers of the virtual keys.

FIG. 2 is a top view of the virtual touch screen keyboard 10 of FIG. 1 in which the virtual key centers 19 (identified by "+" symbols) of the virtual keys 12 are identified. It will be appreciated that the + symbol is not actually shown on the virtual keys 12, but is used in the figures for reference. As explained above, the virtual key centers 19 are laterally spaced apart from each other by a pitch P. In many cases, such as with existing virtual touch screen keyboards on tablets, the pitch P is constant.

Figure 3:
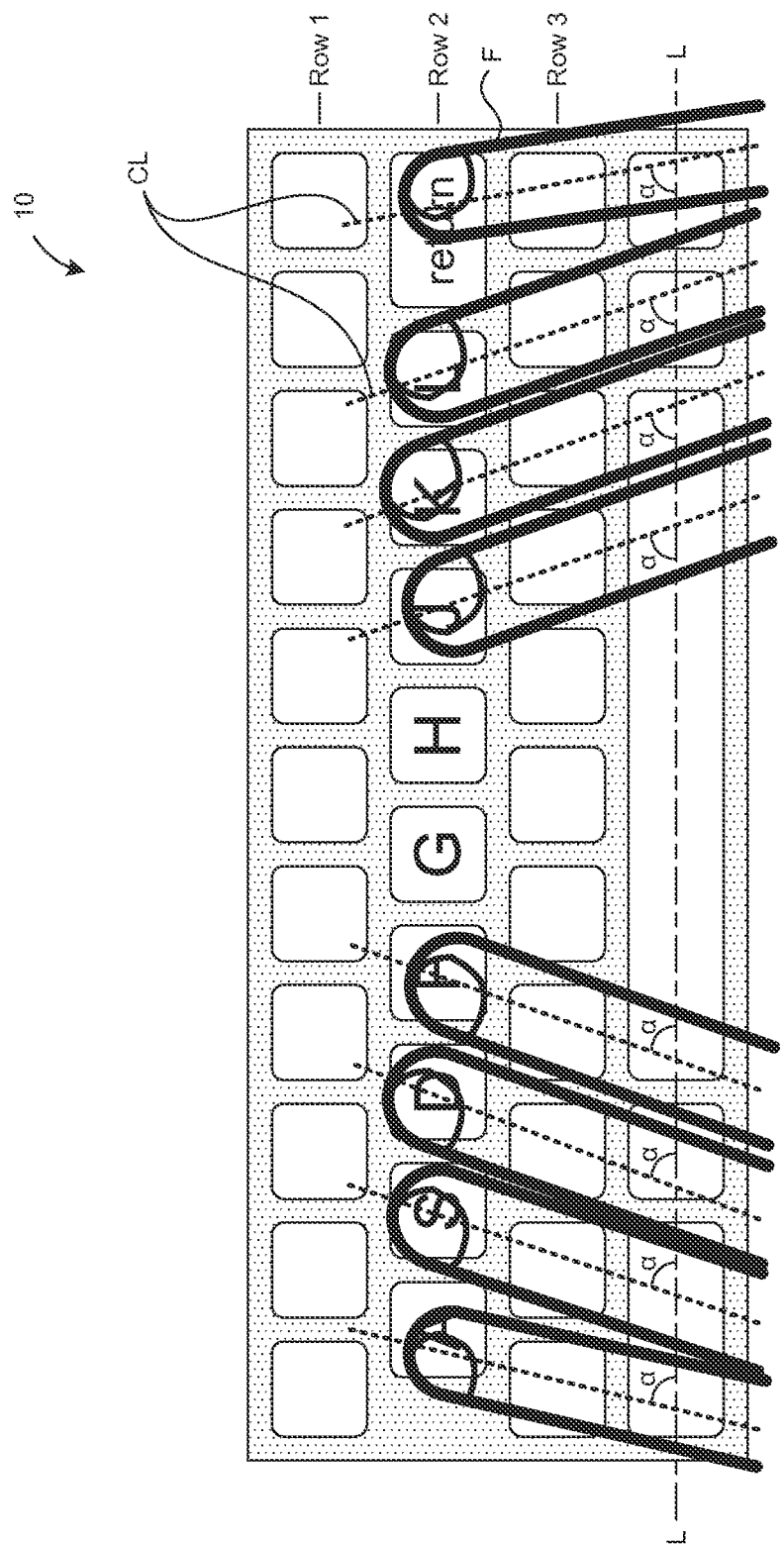
FIG. 3 shows typical finger positioning on the home row rest keys of a typical virtual keyboard in which the angles a of the longitudinal center lines of the fingers relative to the lateral axis L-L of the home row keys are approximately equal to each other because the fingers are squished together.

FIG. 3 is a top view of the virtual touch screen keyboard 10 showing a typical finger positioning on the home row keys of Row 2. The fingers F have center lines CL that extend at angles a with respect to a lateral axis L-L of the home row keys. In the case of smaller virtual touch screens with tight pitches, such as pitches of approximately 10 mm to 18 mm, the fingers F are so close together that the angles a of the center lines CL are approximately equal to each other. The fingers F in such cases are at least nearly parallel to each other, which in turn makes it very difficult to accurately touch type.

Figure 4:
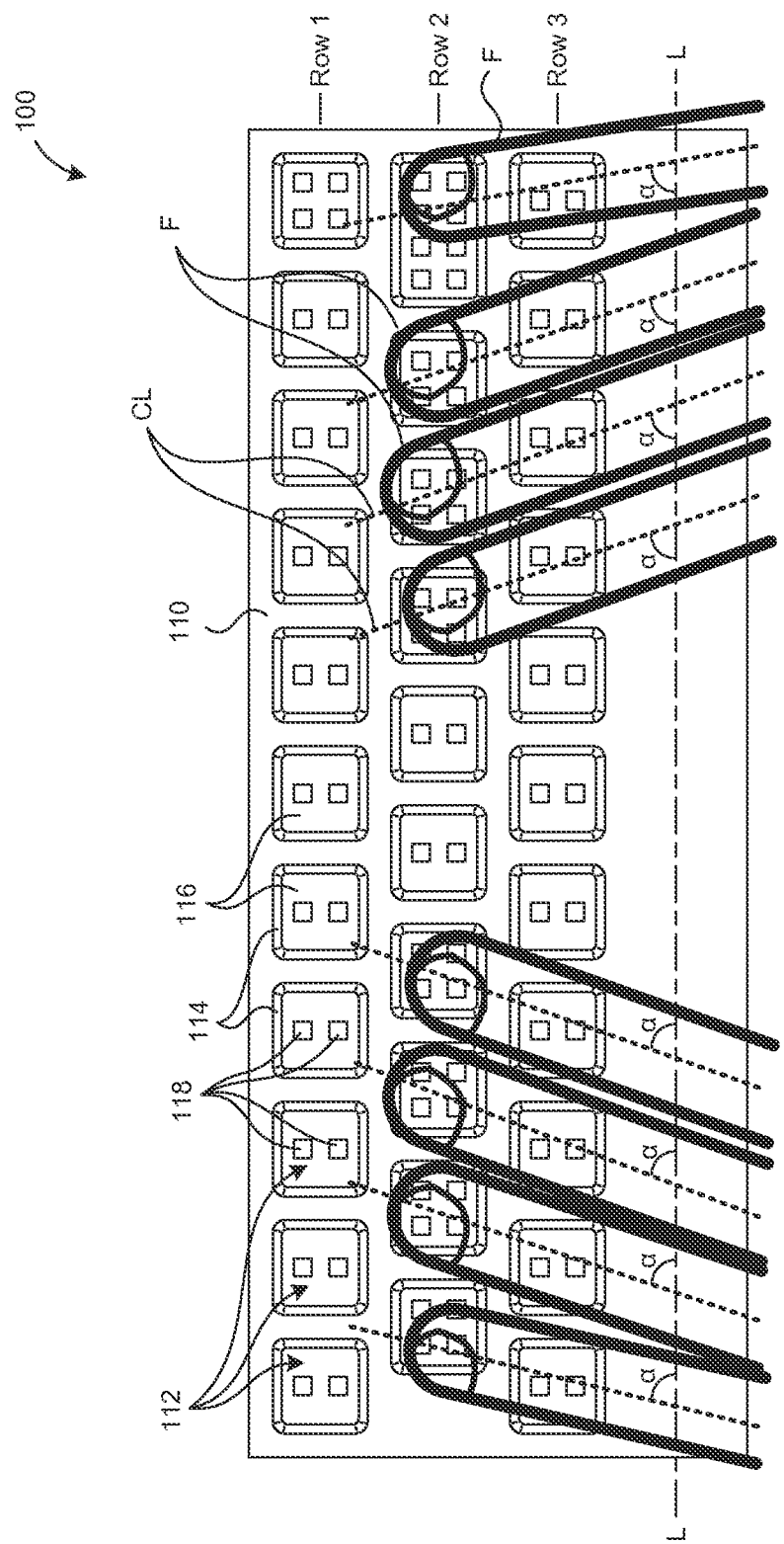
FIG. 4 shows finger positioning with a keyboard overlay in accordance with an embodiment of the present technology. The key structures of the keyboard overlay spread the fingers further apart such that the differences between the angles a of the center lines of the fingers are greater than those for the finger positioning without the keyboard overlay shown in FIG. 3.

FIG. 4 is a top view of a keyboard overlay 100 in accordance with an embodiment of the present technology. In several embodiments, the keyboard overlay 100 has a base 110 and a plurality of overlay key structures 112 configured to correspond to the underlying virtual keys 12 (FIG. 1). Each overlay key structure 112 can have sidewalls 114 that extend vertically fi-om the base 110 and a top surface 116 between the sidewalls 114. Each overlay key structure 112 can also include at least one support structure 118 configured to buckle or otherwise compress under the downward force during a key strike. The keyboard overlay 100 can be made from a dielectric elastomeric material that is sufficiently thin so that proximity-based virtual touch screen keyboards can sense the presence of a finger or another object when a key structure 112 is depressed. Several embodiments of suitable key structures 112 and materials are described in U.S. Pat. No. 8,206,047 incorporated by reference above.

The overlay key structures 112 in the embodiment of the keyboard overlay 100 shown in FIG. 4 are arranged to increase the spacing between the fingers F for improving the accuracy and experience of touch typing on a virtual touch screen keyboard. For example, the angles a of the center lines CL of the fingers F are generally different from each other indicating that the fingers F are spaced apart from each other. Comparing the angles a between FIGS. 3 and 4, it is clear that the lateral spacing (e.g., pitch) of the overlay key structures 112 allows the user greater space between fingers F for ease of touch typing.

Figure 5:
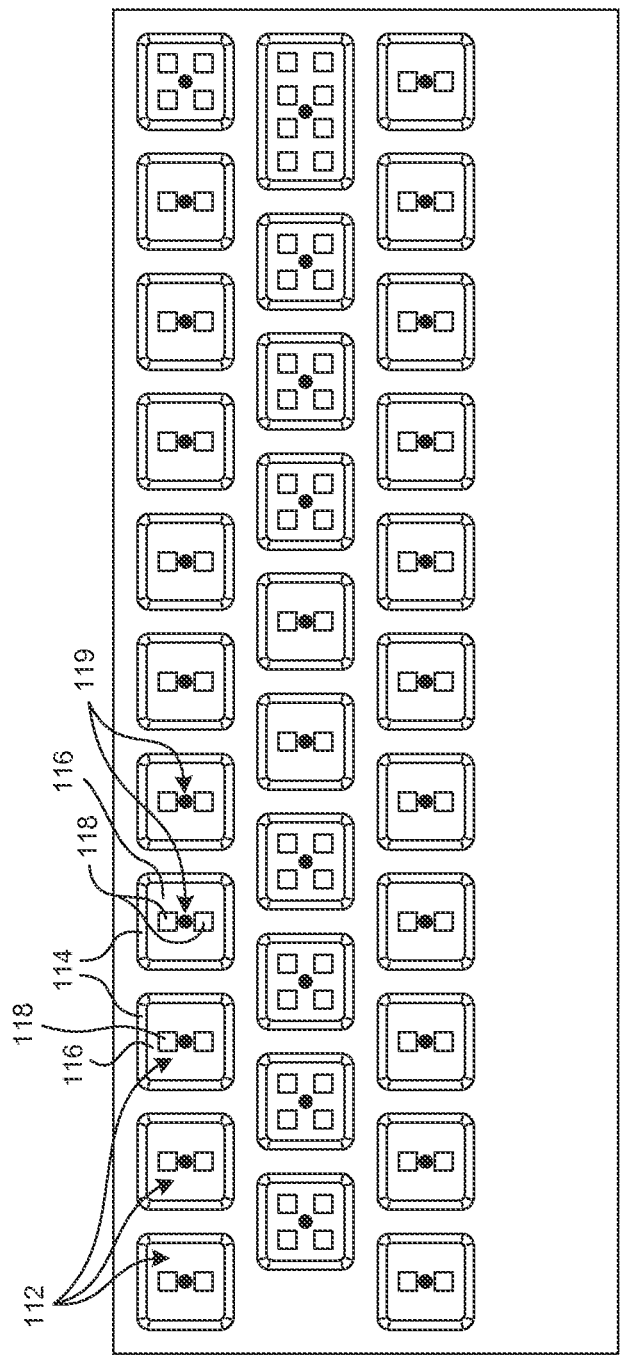
FIG. 5 shows the centers of each overlay key structure represented by a "0" symbol.

FIG. 5 is another top view of the keyboard overlay 110 showing the overlay key centers 119 (identified by "O" symbols) of the individual overlay key structures 112. It will be appreciated that the overlay key centers 119 are not actually shown on the key structures 112, but are merely reference symbols in the drawings to explain the layout of the overlay key structures 112 for use with a virtual touch screen keyboard.

Figure 6:
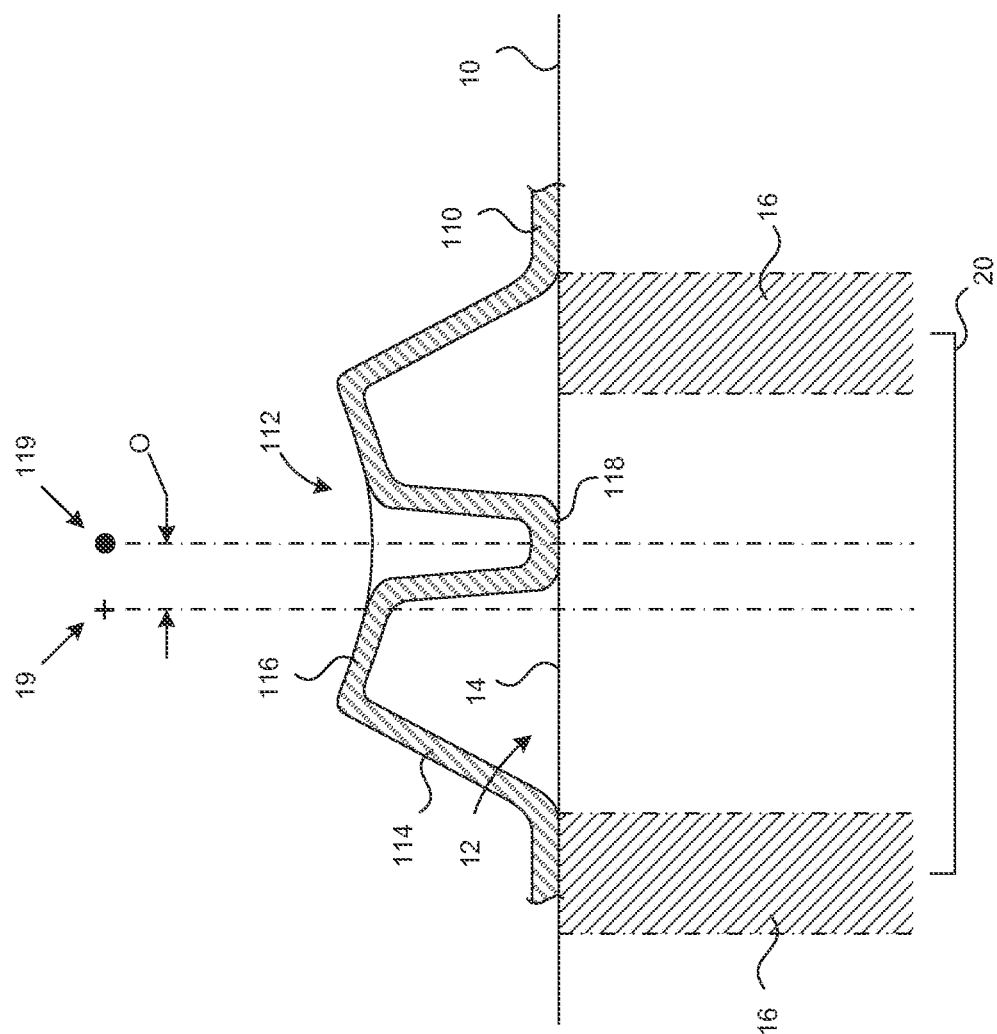
FIG. 6 is a cross-sectional view of a typical key structure of an embodiment of a keyboard overlay in accordance with the present technology showing the positioning of the key structure relative to gray zones of an underlying virtual keyboard (gray zones are hatched). The center of the virtual key is represented by a "+" symbol and the center of the overlay key structure is represented by a "0" symbol. Note that the center of the overlay key structure is not on the center of the virtual key (e.g., offset centers).
Figure 7:
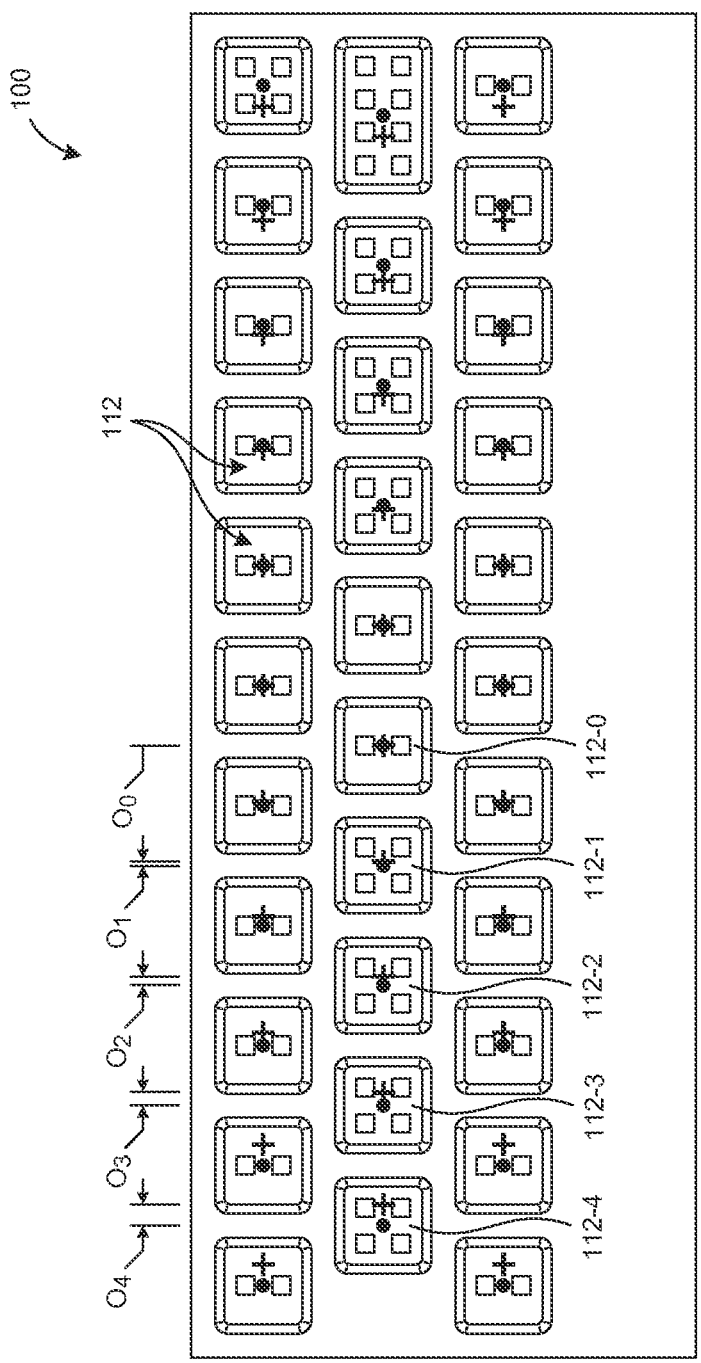
FIG. 7 shows the centers of the overlay key structures ("0") of a keyboard overlay in accordance with an embodiment of the present technology overlaid onto the virtual keyboard key centers ("+") of an underlying virtual keyboard in which the overlay key structure centers ("0") are laterally offset from corresponding virtual key centers ("+").

FIG. 6 is a cross-sectional view of a portion of the keyboard overlay 110 and the virtual touch screen keyboard 100, and FIG. 7 is a top view of the keyboard overlay 110 showing the offset of the overlay key centers 119 of the overlay key structures 112 with respect to the key centers 19 of the underlying virtual keys. Referring to FIG. 6, the overlay key center 119 of the overlay key structure 112 is offset from the virtual key center 19 of a corresponding virtual key 12 by a distance "O". The overlay key structure 112 takes advantage of the active area 20 of the virtual key 12, including in the first area 14 and the halves of the second areas 16 adjacent the first area 14.

Referring to FIG. 7, the offset distance O can increase with each successive overlay key structure 112 laterally outward of the central keys of a row. For example, a central overlay key structure 112-0 may be aligned or have a small or negative offset $O_0$, a first laterally outward overlay key structure 112-1 may have an offset $O_1$, a second laterally outward overlay key structure 112-2 may have an offset $O_2$, a third laterally outward overlay key structure 112-3 may have an offset $O_3$, and a fourth overlay key structure 112-4 may have an offset of $O_4$. In several embodiments, $O_1<O_2<O_3<O_4$. For purposes of convention, a negative offset is when the key center 119 of an overlay key structure 112 is spaced laterally inward of a key center 19 of a corresponding virtual key, whereas a positive offset is when the key center 119 of an overlay key structure 112 is spaced laterally outward of a center 19 of a corresponding virtual key 12. In another embodiment, the center key structure 112-0 and the first outward overlay key structure 112-1 can both have key centers aligned with their corresponding underlying virtual keys 12 (i.e., no lateral offset or a lateral offset of zero), while the second-fourth outward key structures 112-2, 112-3 and 112-4 have increasing offsets. In still other embodiments, the center overlay key structure 112-0 can have a negative offset, the first outward overlay key structure 112-1 can have a center aligned with the center of the corresponding underlying virtual key 12, and the second-fourth outward overlay key structures 112-2, 112-3 and 112-4 have increasing offsets $O_2<O_3<O_4$. Only the arrangement of the Western overlay key structures of the home row in FIG. 7 are described, but it will be appreciated that the Eastern overlay key structures and the overlay key structures of other rows can be arranged in the same manner.

Figure 8:
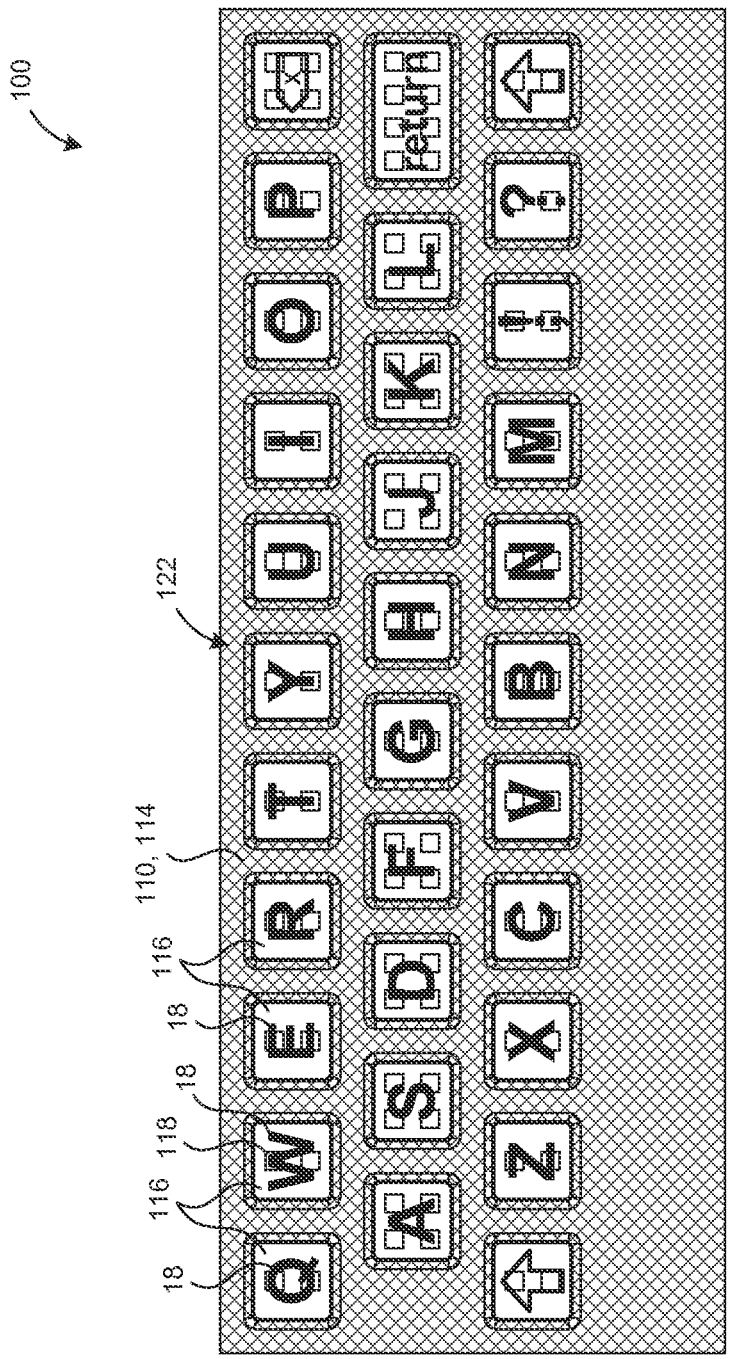
FIG. 8 shows a texture pattern, represented by cross-hatching, on keyboard overlays in accordance with an embodiment of the present technology, wherein the overlay key structures have optically clear tops and supporting interior supports to provide direct visualization of the indicia of the virtual keyboard.

FIG. 8 is a top view of another embodiment of a keyboard overlay 100 in accordance with the present technology. In this embodiment, the keyboard overlay has an obfuscation mechanism 122 that obfuscates the actual boundaries of the virtual keys 12 (FIG. 1) of the underlying virtual keyboard. For example, the base 110 and the sidewalls 114 of the keyboard overlay 110 can be textured, colored or otherwise at least substantially opaque to prevent visualization of the second areas 116 of the virtual keys 12 shown in FIG. 1. The obfuscation mechanism 122 prevents a user from being distracted or bothered by the offset between the overlay key structures 112 and the virtual keys 12. Additionally, the top surfaces 116 of the keyboard overlay 100 of this embodiment can be transparent to allow a user to directly visualize the indicia 18 of the underlying virtual keys 12. In still another embodiment, the entire keyboard overlay 100 can be generally opaque and have indicia centered on the key centers 119 of the overlay key structures 112; such indicia can identify the corresponding virtual keys 12 under the overlay key structures 112.

From the foregoing, it will be appreciated that specific embodiments of the invention have been described herein for purposes of illustration, but that various modifications may be made without deviating from the scope of the invention. For example, the key centers of the overlay key structures can be offset elevationally (e.g., North-South direction) relative to the underlying virtual keys in addition to or in lieu of being laterally offset. The key centers of the overlay key structures in Row 1 can be elevationally offset north of the virtual key centers of Row 1 of the virtual keyboard, and the key centers of the overlay key structures in Row 3 can be elevationally offset in a south direction of the virtual key centers of Row 3 of the virtual keyboard. The overlay key centers, therefore, can be offset elevationally outward (e.g., either further North or South) of the virtual key centers of corresponding virtual keys. This further increases the spacing between the key structures for enhancing the accuracy and experience of touch typing on a virtual key board. In several embodiments, the overlay key structures in the home row are at the same elevation as the underlying virtual keys, but even selected overlay key structures in the home row may be elevationally offset with respect to corresponding virtual keys. Therefore, the present technology includes overlay keyboards with selected key structures configured to be laterally and/or elevationally offset with respect to corresponding virtual keys of a virtual keyboard.

We claim:

1. A keyboard overlay for use with a virtual touch screen keyboard having a plurality of virtual keys, wherein the virtual keys have virtual key centers laterally spaced apart in an East-West direction from each other, the overlay comprising:
    a base configured to be coupled to the virtual touch screen keyboard; and
    a plurality of overlay key structures, wherein individual overlay key structures have overlay key centers that are within active areas of the corresponding virtual keys, and wherein at least a subset of the overlay key structures are arranged such that the overlay key centers of the subset are offset relative to the virtual key centers of corresponding virtual keys.

2. The keyboard overlay of claim 1, wherein the overlay key centers of central overlay key structures are at least substantially aligned with their corresponding underlying virtual key centers, and wherein overlay key structures laterally outward of the central overlay key structures have a positive lateral offset relative to corresponding underlying virtual keys.

3. The keyboard overlay of claim 1, wherein the offsets of the outward overlay key structures increase with increasing distance from the central overlay key structures.

4. The keyboard overlay of claim 1, wherein the virtual keyboard has a QWERTY layout, and wherein the overlay key centers of at least the A, S, D, K, L and ";" overlay key structures are laterally offset with respect to the virtual key centers of the A, S, D, K, L and ";" virtual keys, respectively.

5. The keyboard overlay of claim 1, further comprising an obfuscation mechanism.

6. The keyboard overlay of claim 1, wherein the overlay key structures have a transparent top surface through which indicia of the virtual keys can be seen.

7. The keyboard overlay of claim 1, wherein the overlay keyboard comprises one or more dielectric materials, and the overlay key structures further comprise support structures configured to compress upon a keystroke by a user.

8. The keyboard overlay of claim 1, wherein the overlay key structures are elevationally offset in a North-South direction.

9. A keyboard overlay for use with a virtual touch screen keyboard having a plurality of virtual keys, wherein the virtual keys have virtual key centers laterally spaced apart in an East-West direction from each other, the overlay comprising:
   a base configured to be coupled to the virtual touch screen keyboard; and
   a plurality of overlay key structures, wherein individual overlay key structures have overlay key centers that are within active areas of the corresponding virtual keys, and wherein at least a subset of the overlay key structures are arranged such that the overlay key centers of the subset are offset relative to the virtual key centers of corresponding virtual keys, wherein the virtual keyboard has a QWERTY layout, wherein the overlay key centers of at least the A, S, D, K, L and ";" overlay key structures are laterally offset with respect to the virtual key centers of the A, S, D, K, L and ";" virtual keys, respectively, and wherein the lateral offset between the overlay key center of the A overlay key structure and the virtual key center of the A virtual key is greater than the lateral offset between the overlay key center of the D overlay key structure and the virtual key center of the D virtual key.

10. The keyboard overlay of claim 9, wherein the overlay key structures have a transparent top surface through which indicia of the virtual keys can be seen.

11. A keyboard overlay for use with a virtual touch screen keyboard having a plurality of virtual keys, wherein the virtual keys have virtual key centers laterally spaced apart from each other, the overlay comprising:
   a base configured to be coupled to the virtual touch screen keyboard; and
   a plurality of overlay key structures, wherein individual overlay key structures have overlay key centers that are within active areas of the corresponding virtual keys, and wherein at least a subset of the overlay key structures are arranged such that the overlay key centers of the subset are offset relative to the virtual key centers of corresponding virtual keys, wherein the offsets are elevational offsets in a North-South direction.

12. The keyboard overlay of claim 11, wherein the keyboard overlay has a first row and a home row south of the first row, and wherein key structures in the first row are offset elevationally with respect to corresponding virtual keys.

13. The keyboard overlay of claim 11, wherein the keyboard overlay has a home row and a southerly row south of the home row, and wherein the overlay key centers of overlay key structures of the southerly row are offset elevationally south of virtual key centers of corresponding virtual keys.

* * * * *